No. 741,451. PATENTED OCT. 13, 1903.
P. L. BRITAIN.
BUILDING BLOCK MOLDING MACHINE.
APPLICATION FILED FEB. 5, 1903.
NO MODEL.
5 SHEETS—SHEET 1.

WITNESSES:
Edward E. Burk
R. E. Hamilton

INVENTOR
P. L. Britain
BY
Warren D. House,
His ATTORNEY

No. 741,451. PATENTED OCT. 13, 1903.
P. L. BRITAIN.
BUILDING BLOCK MOLDING MACHINE.
APPLICATION FILED FEB. 5, 1903.
NO MODEL. 5 SHEETS—SHEET 2.

WITNESSES:
Edward E. Burke
R. E. Hamilton

INVENTOR
P. L. Britain
BY
Warren D. House
His ATTORNEY

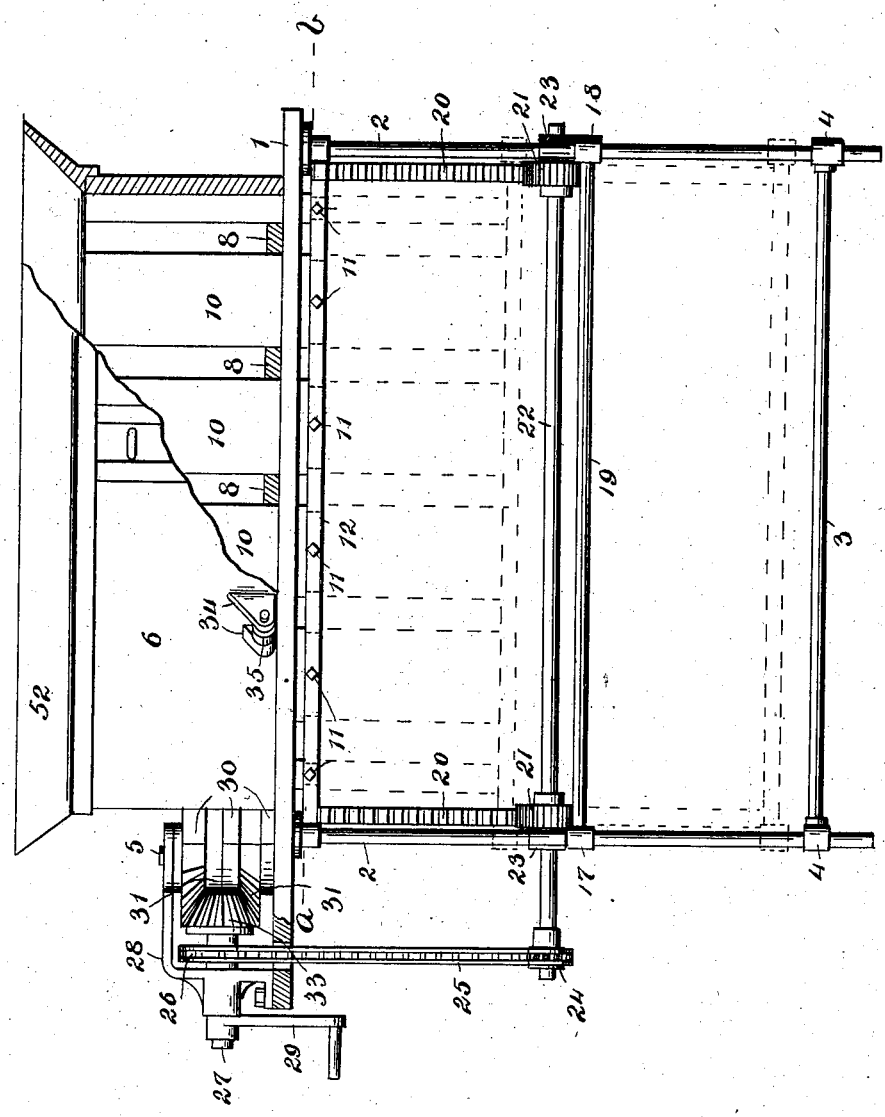

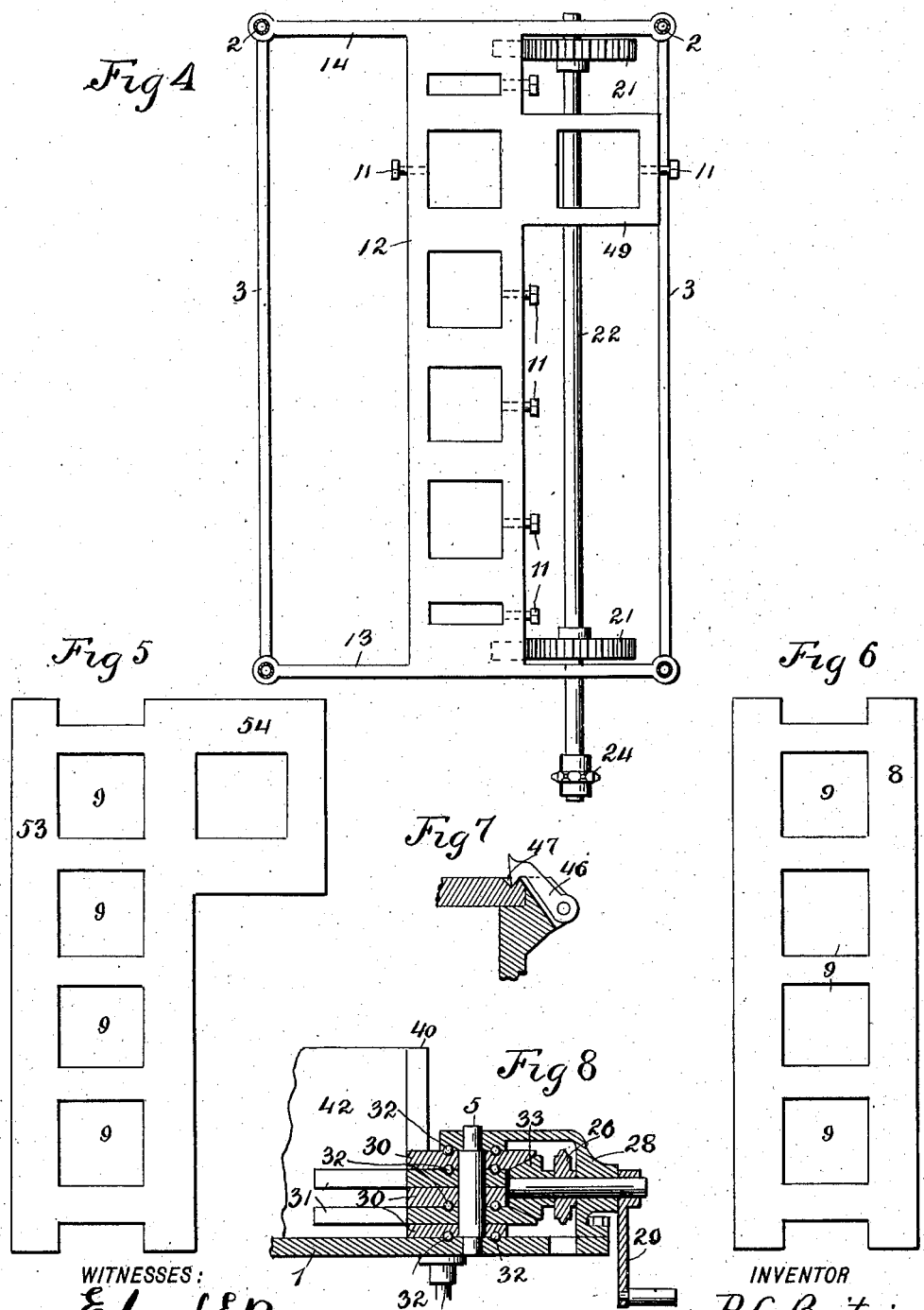

No. 741,451. PATENTED OCT. 13, 1903.
P. L. BRITAIN.
BUILDING BLOCK MOLDING MACHINE.
APPLICATION FILED FEB. 5, 1903.
NO MODEL. 5 SHEETS—SHEET 5.

WITNESSES:
Edward E. Burke
R. E. Hamilton

INVENTOR
P. L. Britain
BY Warren D. House,
His ATTORNEY

No. 741,451. Patented October 13, 1903.

UNITED STATES PATENT OFFICE.

PERRY L. BRITAIN, OF BUSCH, OKLAHOMA TERRITORY.

BUILDING-BLOCK-MOLDING MACHINE.

SPECIFICATION forming part of Letters Patent No. 741,451, dated October 13, 1903.

Application filed February 5, 1903. Serial No. 142,010. (No model.)

*To all whom it may concern:*

Be it known that I, PERRY L. BRITAIN, a citizen of the United States of America, residing in Busch, in the county of Roger Mills, Oklahoma Territory, have invented a new and useful Improvement in Building-Block-Molding Machines, of which the following is a specification, reference being had therein to the accompanying drawings, forming a part thereof.

My invention relates to improvements in building-block-molding machines.

The object of my invention is to provide a machine for molding hollow blocks of concrete or similar material for use in constructing walls of houses.

My invention provides a machine in which the two members forming the side walls of the mold are so hinged upon a supporting-frame as to be swung in a horizontal plane toward and from a removable bottom plate, together with one or more cores insertible through the bottom plate, and means by which the core or cores may be reciprocated when the two members are swung upon the supporting-frame.

My invention provides means also by which the same machine used for molding straight blocks may be so altered as to be used for molding blocks having a right-angled extension, such angled blocks being used for corner-blocks.

My invention provides a construction in which the parts may be quickly assembled in position for molding and as quickly changed to a position in which the molded block may be removed.

My invention provides other novel features hereinafter described and claimed.

Figure 1:
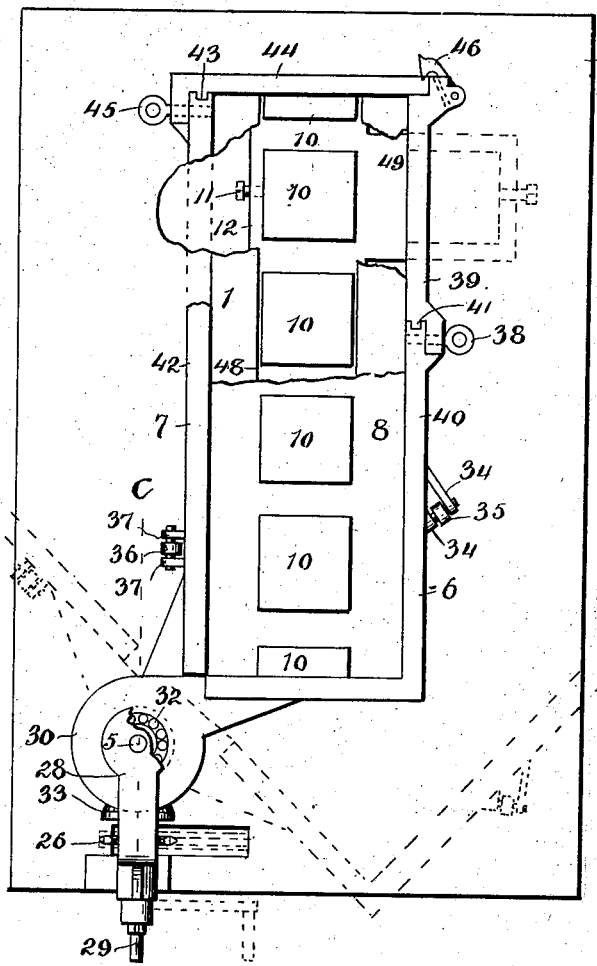
Figure 2:
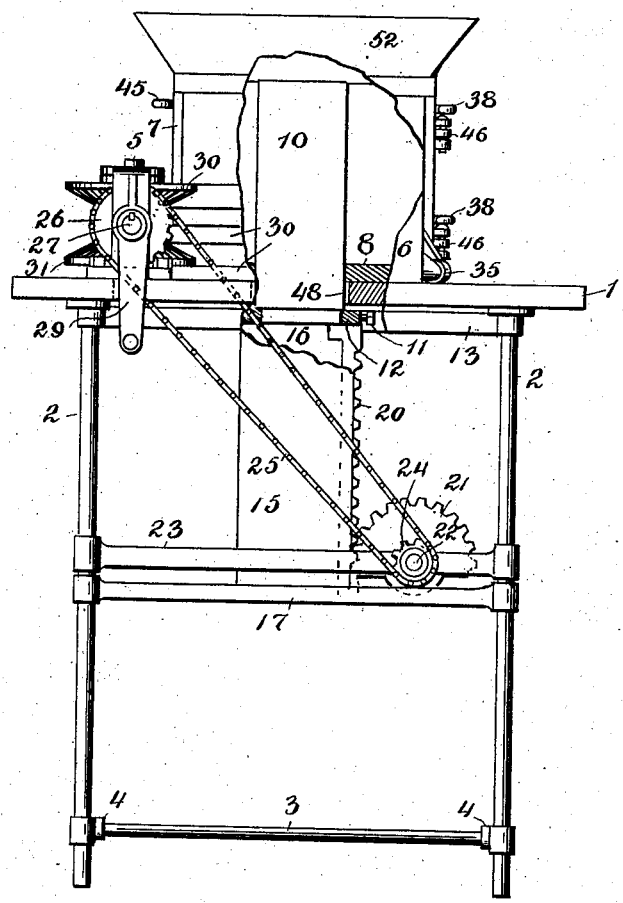
Figure 9:
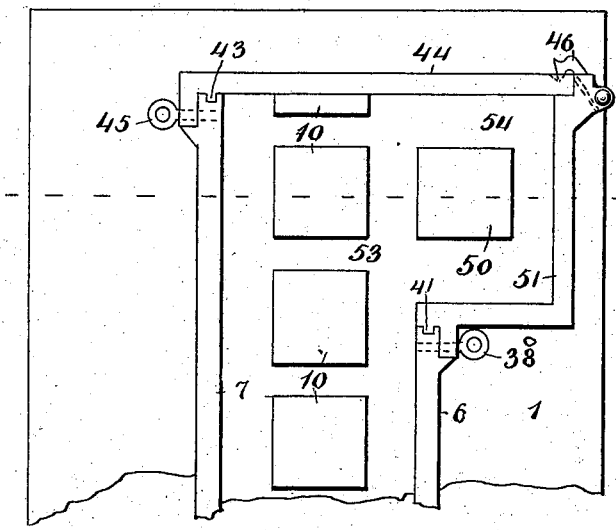
Figure 10:
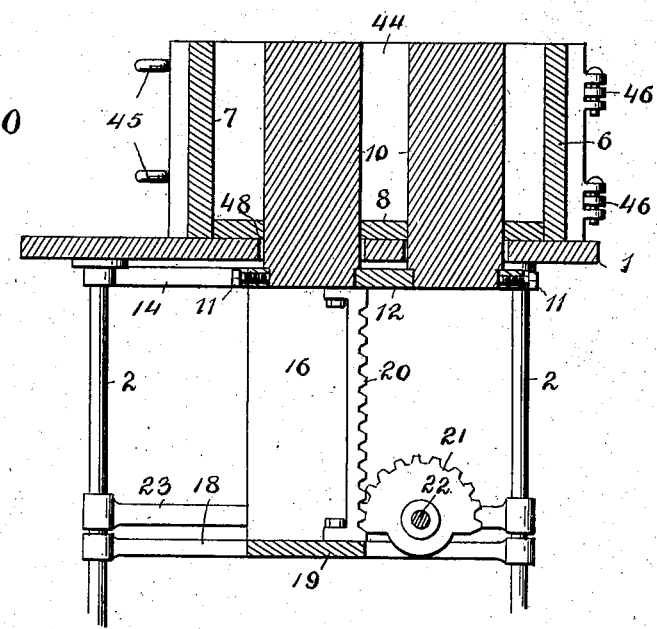

In the accompanying drawings, illustrative of my invention, Figure 1 is a plan view with portions broken away and representing the two members in the closed position. Fig. 2 is an end elevation view with portions broken away, so as to disclose the end core. In this view the two hinged members are shown in the closed position and the cores in the elevated position. Fig. 3 is a side elevation view in the closed position, a portion of one of the hinged members and a portion of the hopper being broken away. Fig. 4 is a horizontal sectional view taken on the dotted line *a b* of Fig. 3, the cores being removed. Fig. 5 is a plan view of one of the removable bottom plates having the lateral extension. Fig. 6 is a similar view of a bottom plate used in molding straight blocks. Fig. 7 is a horizontal sectional view of a portion of the two hinged members and showing the locking device for clamping the two members together when in the closed position. Fig. 8 is a vertical sectional view taken on the dotted line *c d* of Fig. 1. Fig. 9 is a plan view of a portion of the two hinged members and parts connected therewith provided with the parts used in molding the angular extension of the block. Fig. 10 is a vertical sectional view taken on the dotted line *e f* of Fig. 9.

Similar characters of reference indicate similar parts.

1 indicates a horizontal supporting-platform provided on its under side with four vertical supporting-legs 2, connected near their lower ends by horizontal rods 3, the ends of which are secured, respectively, to brackets 4, mounted upon the legs 2, one to each leg. Near one corner of the platform 1 is secured upon the upper side thereof a vertical post 5.

Referring particularly to Figs. 1, 2, 3, and 8, 6 and 7 indicate, respectively, two members hinged to the post 5 and adapted to swing in a horizontal plane thereon toward and from the horizontal removable bottom plate 8, which is adapted to rest upon the platform 1. Any number of bottom plates may be employed, one at a time being used upon the platform when a block is being molded. Each of the removable bottom plates 8 is provided with a plurality of openings therethrough (indicated by 9) through which a series of vertical cores 10 may be reciprocated. The cores 10 are secured at their lower ends by means of set-screws 11 in openings provided in a horizontal plate 12, located below the platform 1 and the bottom plate 8 and supported at its ends respectively by horizontal transverse bars 13 and 14, the ends of which are provided each with a vertical hole in which one of the legs 2 is mounted. The bars 13 and 14 are connected, respectively, by two vertical plates 15 and 16 with two similar horizontal bars 17 and 18, mounted upon the legs 2 in a manner similar to the manner of mounting the bars 13 and 14. The plate 12, bars 13, 14, 17, and 18, and plates 15 and 16 form a core-supporting frame which may be vertically reciprocated upon the legs 2, so as to elevate and lower the cores 10 as desired. The bars 17 and 18 may be connected each to one end of a horizontal plate 19, which serves to brace the core-supporting frame and which also supports the lower ends of two vertical racks 20, the upper ends of which are secured to the under side of the plate 12, the said racks being located, respectively, near the ends of the plate 19. Meshing with the racks 20 are two segmental gear-wheels 21, disposed with one rack meshing with one gear. The said segmental gear-wheels are mounted upon and rotatable with a horizontal rotatable shaft 22, mounted in transverse openings provided in the two horizontal transverse bars 23, the ends of which are secured, respectively, to the legs 2. Upon the left end of the shaft 22, as viewed in Fig. 3, outside the adjacent bar 23, is rigidly mounted a sprocket-wheel 24, connected, by means of a sprocket-belt 25, with a sprocket-wheel 26, mounted upon and rotatable with a rock-shaft 27, which is rotatably mounted in a bearing provided horizontally in the vertical arm of a right-angled bracket 28, the lower end of which is rigidly secured to the top of the platform 1. A horizontal arm of the bracket 28 extends inwardly and is provided near its end with a vertical hole in which is extended the upper end of the post 5. The shaft 27 is rocked by means of a crank 29, secured upon the outer end of the said shaft. Upon the member 6 are provided three projections 30, each of which is provided with a vertical hole fitted to the post 5. The member 7 is provided with two similarly-arranged projections 31, similarly mounted upon the post 5. By means of the said projections the members 6 and 7 may be swung in a horizontal plane on the post 5 toward and from the bottom plate 8. In the lower side of the horizontal arm of the bracket 28 and in the upper side of the upper projection 30 are provided oppositely-disposed annular grooves in which is mounted a series of balls 32, which serve to make a frictionless bearing between the said upper projection 30 and the bracket 28. Similar grooves and similar series of balls are provided in the lower side of the upper and lower projections 30, in the upper side of the lower projection 31, in the upper side of the upper projection 31, in the upper side of the platform 1, and in the lower side of the middle projection 30, as shown in Fig. 8. The upper projection 30 and the lower projection 31 have each a portion arcuate in form, the arcuate portion of each being provided with bevel gear-teeth which mesh with a bevel gear-wheel 33, which is mounted on and rotatable with the rock-shaft 27.

By rocking the shaft 27 by means of the crank 29 the members 6 and 7 are swung upon the post 5 through the intermediacy of the bevel-gear 33 and the toothed projections 30 and 31. Upon the outer side of the member 6, near the lower side thereof, are provided two lateral projections 34, between which is rotatably mounted a roller 35, adapted to run upon the platform 1 and assisting in supporting the weight of the member 6. A similar roller 36 is similarly mounted between similar projections 37, provided on the outer side of the member 7. In the form shown in Fig. 1 the member 6 comprises a vertical right-angled plate provided with the projections 30 and having detachably secured to it by screws 38 a vertical plate 39. The vertical plate 39 and the right-angled plate to which it is secured form one side and end of the mold. The right-angled plate forming a portion of the member 6 and indicated by 40 is grooved at its outer end to receive the tongue 41 of the vertical plate 39. The member 7 comprises a straight vertically-disposed plate 42, which is provided at one end with the projections 31 and is grooved at its outer end to receive a tongue 43 on the inside of the transverse vertical plate 44, to which the plate 42 is secured by screws 45. The plates 42 and 44 form the member 7 and also form one end and one side of the mold. Upon the outer end of the vertical plate 39 are provided one or more hooks 46, pivoted to the plate 39. Each of said hooks is adapted to have its free end enter a recess 47, provided in the plate 44 when the parts are in the position shown in Fig. 1. The platform 1 is provided with a longitudinal slot 48, through which the cores 10 may reciprocate. The cores 10 are shouldered on their lower ends, so as to rest securely in the plate 12. The plate 12 is provided at one side with an extension 49, provided with a hole therethrough adapted to receive therein a supplemental core 50, which forms the hollow space in the angle building-block when the same is molded. In molding the straight blocks the core 50 is removed.

When it is desired to mold an angle-block, the core 50 is mounted in the hole in the extension 49 and secured therein by the set-screw 11 similar to the other set-screws used to hold the cores 10 in position. The plates 44 and 39 are detached and replaced, respectively, by a longer plate 44 and a right-angled plate 51, as shown in Figs. 9 and 10. The right-angled plate 51 is secured by the screws 38 to the angular plate 40, a space being provided between the insides of the angled plate 51 and the sides of the core 50, in which material for forming the block may be placed. Similar space is provided between the plates 39, 40, 44, and 42 and the cores 10 to receive the material for the block. The angled plate 51 is also provided with hooks 46, adapted to enter the recesses 47 in the plate 44.

In operating my invention the parts are assembled as shown in Fig. 1, with a bottom plate 8 placed between the members 6 and 7 and resting upon the platform 1. The two members are then locked together by inserting the hooks 46 in the recesses 47. A hopper 52, rectangular in form, is then affixed to the top edges of the members 6 and 7, through which the material for forming the block is inserted. The crank 29 is first turned so as to elevate the cores 10 to the position shown in Fig. 2. After the material for making the block has been placed in the mold and tamped the hooks 46 are released and the crank 29 turned to the position shown in dotted lines in Fig. 1, when the members 6 and 7 will be swung to the positions shown in dotted lines in the said figure. The block may then be removed, with the bottom plate 8, the cores 10 having been lowered by the turning of the crank 29 through the intermediacy of the mechanism already described. To form another block, another bottom plate 8 is placed on the platform and the crank 29 turned back to the position shown in Fig. 2, thus elevating the cores and swinging the members 6 and 7 to the closed position. The hooks 46 are then engaged to the plate 44, and the hopper 52, which was removed, is replaced on the top of the mold. The material is then placed in the mold to form the next block. It will be noted that the end cores lie next the ends of the mold, thus forming at each end of the block a vertical groove.

In making an angle-block the parts are assembled as shown in Figs. 9 and 10, and a bottom plate such as is shown in Fig. 5 is used instead of the kind used in making straight blocks. This bottom plate (indicated by 53) is provided with a right-angled extension 54, having a vertical hole in the extension through which the core 50 may reciprocate. This form of my invention is operated as described with reference to the mechanism used in making straight blocks.

Having thus described my invention, what I claim, and desire to secure by Letters Patent, is—

1. In a building-block-molding machine, the combination with a support, of a removable bottom plate adapted to be mounted thereon and provided with an opening therethrough, two members so hinged to the said support as to be swung in a horizontal plane toward and from the said removable bottom plate and forming, when in the closed position, the sides and ends of the mold, a core insertible through the opening in the said bottom plate, and means for simultaneously swinging the two said members and reciprocating the said core, substantially as described.

2. In a building-block-molding machine, the combination with a support, of a removable bottom plate adapted to be mounted thereon and provided with a plurality of openings therethrough, two members so hinged to the said support as to be swung in a horizontal plane toward and from the said removable bottom plate and forming, when in the closed position, the sides and ends of the mold, a plurality of cores reciprocable through the said openings respectively in the said bottom plate, and means for simultaneously swinging the two said members and reciprocating the said cores, substantially as described.

3. In a building-block-molding machine, the combination with a support, of a removable bottom plate adapted to be mounted thereon and provided with an opening therethrough, two members hinged to the said support and adapted to be swung thereon in a horizontal plane toward and from the removable bottom plate and forming, when in the closed position, the sides and ends of the mold, a core-support vertically reciprocable upon the said support, a core mounted on the core-support and adapted to be reciprocated through the opening in the bottom plate when the core-support is reciprocated, and means for laterally swinging the two members when the core-support is reciprocated, substantially as described.

4. In a building-block-molding machine, the combination with a supporting-frame, of a removable bottom plate adapted to be mounted thereon and provided with an opening therethrough, two members hinged to the said supporting-frame and adapted to be swung thereon in a horizontal plane and forming, when in the closed position, the sides and ends of the mold, a core-support vertically reciprocable upon the said supporting-frame, a core mounted on the core-support and adapted to be reciprocated through the opening in the bottom plate when the core-support is reciprocated, a rack mounted on the core-support, a rotatable shaft mounted on the supporting-frame, a segmental gear-wheel mounted on and rotatable with the said shaft and meshing with the said rack, and means for laterally swinging the two members when the said shaft is rotated, substantially as described.

5. In a building-block-molding machine, the combination with a horizontal supporting-platform, of a vertical post mounted thereon, a removable bottom plate adapted to be mounted on the said platform and provided with an opening therethrough, a core vertically reciprocable through the said opening, two members hinged to the said post and adapted to be swung thereon toward and from the said bottom plate and forming the sides and ends of the mold, and means for vertically moving the said core when the two members are swung on the post, substantially as described.

6. In a building-block-molding machine, the combination with a supporting-platform, of a post mounted thereon at right angles thereto, a plurality of removable bottom plates provided each with an opening therethrough, and adapted each to be mounted upon and used consecutively with the said platform, a core vertically reciprocable through the opening in the bottom plate which is resting upon the said platform, two members hinged to the said post and adapted to be swung thereon toward and from the said core, and forming the sides and ends of the mold, and means for vertically moving the core when the two members are swung on the post, substantially as described.

7. In a building-block-molding machine, the combination with a supporting-frame, of a removable bottom plate adapted to be mounted upon the supporting-frame and provided with an opening therethrough, a core reciprocable through the said opening, two members hinged to the said supporting-frame and adapted to be swung thereon toward and from the said bottom plate, and two rolling supports each supporting one of the said members and both resting upon the said supporting-frame, substantially as described.

8. In a building-block-molding machine, the combination with a supporting-frame, of a removable bottom plate adapted to be mounted thereon and provided with an opening therethrough, a core reciprocable through the said opening, two members hinged to the said supporting-frame and provided each with a projection having a portion in arcuate form, the arcuate portion being provided with gear-teeth, a rotatable shaft mounted on the said support, means for rotating the said shaft, a gear-wheel rotatable with the said shaft and meshing with the toothed portions of the two projections, the disposition of the said projections being concentric with the axis of rotation of the hinged members, and means for reciprocating the said core when the said shaft is rotated, substantially as described.

In testimony whereof I have signed my name to this specification in presence of the two subscribing witnesses.

PERRY L. BRITAIN.

Witnesses:
C. J. HUGHES,
E. B. HUGHES.